(12) United States Patent
Supino et al.

(10) Patent No.: US 7,633,704 B2
(45) Date of Patent: Dec. 15, 2009

(54) REGULATING TUNING RATE OF ADAPTIVE FILTER COEFFICIENTS FOR FEED-FORWARD DISTURBANCE REJECTION IN A SERVO CONTROL LOOP

(75) Inventors: Louis Supino, Niwot, CO (US); Frank W. Bernett, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 12/110,957

(22) Filed: Apr. 28, 2008

(65) Prior Publication Data

US 2009/0268340 A1    Oct. 29, 2009

(51) Int. Cl.
*G11B 21/02*    (2006.01)
(52) U.S. Cl. .................... 360/75; 360/55; 360/77.02
(58) Field of Classification Search .................... None
See application file for complete search history.

(56) References Cited

U.S. PATENT DOCUMENTS

| | | | |
|---|---|---|---|
| 5,691,893 A * | 11/1997 | Stothers ................ 700/28 |
| 6,402,089 B1 | 6/2002 | Kiss et al. |
| 6,414,813 B2 | 7/2002 | Cvancara |
| 6,460,803 B1 | 10/2002 | Kiss et al. |
| 6,493,689 B2 | 12/2002 | Kotoulas et al. |
| 6,580,579 B1 | 6/2003 | Hsin et al. |
| 6,710,966 B1 * | 3/2004 | Codilian et al. ......... 360/77.08 |
| 6,751,602 B2 | 6/2004 | Kotoulas et al. |
| 7,054,094 B2 * | 5/2006 | Zhang et al. ............ 360/77.02 |
| 7,177,246 B2 | 2/2007 | Hanks et al. |
| 7,486,470 B1 * | 2/2009 | Semba .................... 360/77.01 |
| 2005/0058031 A1 | 3/2005 | Hanks |
| 2005/0219727 A1 | 10/2005 | Kajiwara et al. |

* cited by examiner

*Primary Examiner*—Jason C Olson
(74) *Attorney, Agent, or Firm*—David K. Lucente

(57) ABSTRACT

In a servo control loop, the rate of change of filter coefficients used by an adaptive filter to counteract external disturbances to head position is regulated in response to a characteristic of an acceleration signal. Regulating the rate of change of the filter coefficients may improve the stability of the servo control loop.

19 Claims, 4 Drawing Sheets

REGULATING TUNING RATE OF ADAPTIVE FILTER COEFFICIENTS FOR FEED-FORWARD DISTURBANCE REJECTION IN A SERVO CONTROL LOOP

BACKGROUND

The present invention generally relates to controlling transducer movement and, more particularly, to controlling transducer movement responsive to a position error signal within a servo control loop.

A typical data storage disk drive includes a plurality of magnetic recording disks which are mounted to a rotatable hub of a spindle motor and rotated at a high speed. An array of read/write heads is disposed adjacent to surfaces of the disks to transfer data between the disks and a host device. The heads can be radially positioned over the disks by a rotary actuator and a closed loop servo system.

The servo system can operate in two primary modes: seeking and track following. During a seek, a selected head is moved from an initial track to a target track on the corresponding disk surface. Upon reaching the target track, the servo system enters the track following mode wherein the head is maintained over the center of the target track while data is written/read. During track following, prerecorded servo information sensed by the head is demodulated to generate a position error signal (PES), which provides an indication of the position error of the head away from a desired location along the track (e.g., the track center). The PES is then converted into an actuator control signal, which is fed back to an head actuator that positions the head.

As the areal density of magnetic disc drives increases, so does the need for more precise position control when track following, especially in the presence of external vibrations which can cause non-repeatable runout (NRRO) of the position error. Disk drives are being incorporated into increasingly diverse types of electronic devices having widely varying vibrational characteristics. For example, disk drives utilized in music and video playback/recording devices can be subjected to speaker induced vibration. Such speaker induced vibration can exceed the track following capabilities of the servo control loop and result in disruption of the music and video stream and associated skipping and/or stalling of the music and video playback/recording and/or failure of the device operation system.

SUMMARY

In a servo control loop, the rate of change of coefficients used by an adaptive filter to counteract external disturbances to head position is regulated in response to a characteristic of an acceleration signal. Regulating the rate of change of the filter coefficients may improve the stability of the servo control loop.

In some embodiments, a circuit includes a filter coefficient adaptation module. that responds to an acceleration signal and a position error signal, which is indicative of head position error, by tuning filter coefficients of an adaptive filter to reduce the position error signal. The filter coefficient adaptation module also responds to a characteristic of the acceleration signal to regulate a rate at which the filter coefficients are changed to track changes of the acceleration signal and/or the position error signal.

In some other embodiments, filter coefficients of an adaptive filter are tuned in response to an acceleration signal and a position error signal, which is indicative of head position error, to reduce the position error signal. A rate of change at which the filter coefficients are changed to track changes of the acceleration signal and/or the position error signal is regulated responsive to a characteristic of the acceleration signal.

In some other embodiments, a servo control circuit includes a finite impulse response filter, a filter coefficient adaptation module, and a head actuator. The finite impulse response filter filters an acceleration signal, which is indicative of mechanical vibration, using a plurality of coefficient weights that are applied to a plurality of time-delay filter taps of the acceleration signal to generate a feed-forward signal. The filter coefficient adaptation module that responds to the acceleration signal and a position error signal, which is indicative of head position error, by tuning the coefficient weights of the finite impulse response filter to reduce the position error signal. The filter coefficient adaptation module responds to a characteristic of the acceleration signal to regulate a rate of change at which the coefficient weights are changed to track changes of the acceleration signal and/or the position error signal. The head actuator responds to the feed-forward signal to counteract disturbances to head position caused by the vibration.

DETAILED DESCRIPTION

Figure 1:
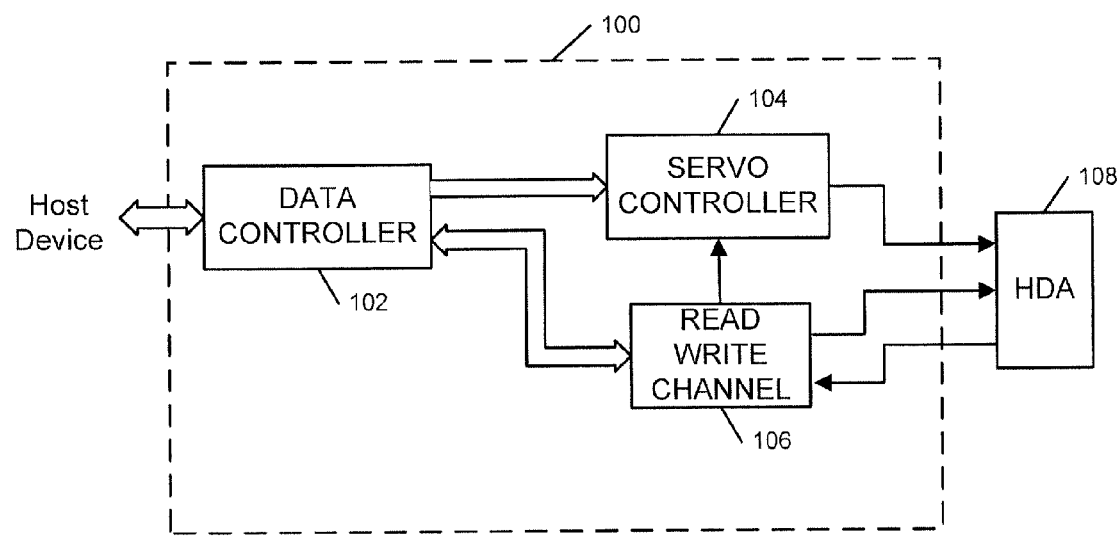
FIG. 1 is a block diagram of disk drive electronic circuits that include a servo controller that is configured in accordance with some embodiments.

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

Some embodiments may be embodied in hardware and/or in software (including firmware, resident software, microcode, etc.). Consequently, as used herein, the term "signal"

may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system. Accordingly, as used herein, the term "circuit" may take the form of digital circuitry, such as processor circuitry (e.g., general purpose microprocessor and/or digital signal processor) that executes program code, and/or analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Although various embodiments of the present invention are described in the context of disk drives for purposes of illustration and explanation only, the present invention is not limited thereto. It is to be understood that the present invention can be more broadly used for any type of servo control loop that can be subject to vibration.

FIG. 1 is a block diagram of disk drive electronic circuits 100 which include a data controller 102, a servo controller 104, and a read write channel 106. Although two separate controllers 102 and 104 and a read write channel 106 have been shown for purposes of illustration and discussion, it is to be understood that their functionality described herein may be integrated within a common integrated circuit package or distributed among more than one integrated circuit package. A head disk assembly (HDA) 108 can include a plurality of data storage disks, a plurality of heads mounted to respective arms and which are moved radially across different data storage surfaces of the disks by a head actuator (e.g., voice coil motor), and a spindle motor which rotates the disks.

Write commands and associated data from a host device can be buffered by the data controller 102. The host device can include, but is not limited to, a desktop computer, a laptop computer, a personal digital assistant (PDA), a digital video recorder/player, a digital music recorder/player, and/or another electronic device that can be communicatively coupled to store and retrieve data in the HDA 108. The data controller 102 carries out buffered write commands by formatting the associated data into blocks with the appropriate header information, and transfers the formatted data via the read/write channel 106 to logical block addresses (LBAs) on a disk in the HDA 108 identified by the associated write command.

The read write channel 106 can convert data between the digital signals processed by the data controller 102 and the analog signals conducted through the heads in the HDA 108. The read write channel 106 provides servo data read from the HDA 108 to the servo controller 104. The servo data can be used to detect the location of the head in relation to LBAs on the disk. The servo controller 104 can use LBAs from the data controller 102 and the servo data to seek the head to an addressed track and block on the disk (i.e., seek mode), and to maintain the head aligned with the track while data is written/read on the disk (i.e., track following mode).

Some embodiments of the servo controller 104 provide an adaptive feed-forward control scheme that utilizes an accelerometer signal to improve the capability of the servo control loop to reject external disturbances while operating in the track settling mode and the track-following mode and subjected to vibration. An adaptive filter responds to filter coefficients to filter the acceleration signal and generate a feed-forward signal that controls a head actuator to counteract disturbances to head position caused by the vibration. The filter coefficients are tuned in response to the acceleration signal and a PES, which is indicative of head position error, to reduce the PES.

More particularly, the filter coefficients are tuned using a modified filtered-X Least Mean Square (LMS) algorithm. The servo controller 104 attempts to adapt the modified filtered-X LMS algorithm to match the unknown disturbance dynamic effects on the servo control loop, and so that the filter coefficients are thereby tuned to cause the feed-forward signal to cancel the deleterious effects of the external disturbances on head position. Accordingly, this may result in a significant reduction of the non-repeatable runout induced by rotational vibration. An exemplary background servo control loop using a filtered-X LMS algorithm is described in U.S. Pat. No. 6,580,579, the entire disclosure of which is incorporated herein by reference as if set forth in its entirety.

In accordance with some present embodiments, a rate of change at which the filter coefficients are changed to track changes of the acceleration signal and/or the position error signal is regulated (constrained) in response to a characteristic of the acceleration signal. The adaptive filter can include a finite impulse response (FIR) filter that filters the acceleration signal to generate the feed-forward signal. The coefficient weights applied to each of a plurality of time-delay taps of the FIR filter are tuned in response to the acceleration signal and a position error signal, and the rate of change of the coefficient weights is regulated in response to a characteristic, such as power level, of the acceleration signal.

Although various embodiments are described in the context of tuning coefficients of a FIR filter, the present invention is not limited thereto. For example, the invention may be used to tune coefficients of other types of filters, including, but not limited to, infinite impulse response (IIR) filters.

This regulation can include increasing the rate at which the coefficient weights are changed to track changes of the acceleration signal and/or the position error signal in response to decreased power level of the acceleration signal, and can further include decreasing the rate of change of the coefficient weights in response to increased power level of the acceleration signal. By constraining the rate of change of the coefficient weights inversely proportional to the power level of the acceleration signal, the stability of the servo control loop may exhibit improved stability in cancelling the deleterious effects on head position of a wider frequency and/or amplitude range of external disturbances.

Although some embodiments herein will be discussed with respect to a single-input, single-output (SISO) discrete time stochastic system. It will be appreciated that the invention is also applicable to other systems. Moreover, although some embodiments are discussed in the context of the discrete time domain (i.e., digital circuitry), using a sampling time index, k, it will further be appreciated that other embodiments of the invention can be embodied in the continuous time domain (i.e., analog and/or hybrid circuitry).

Figure 2:
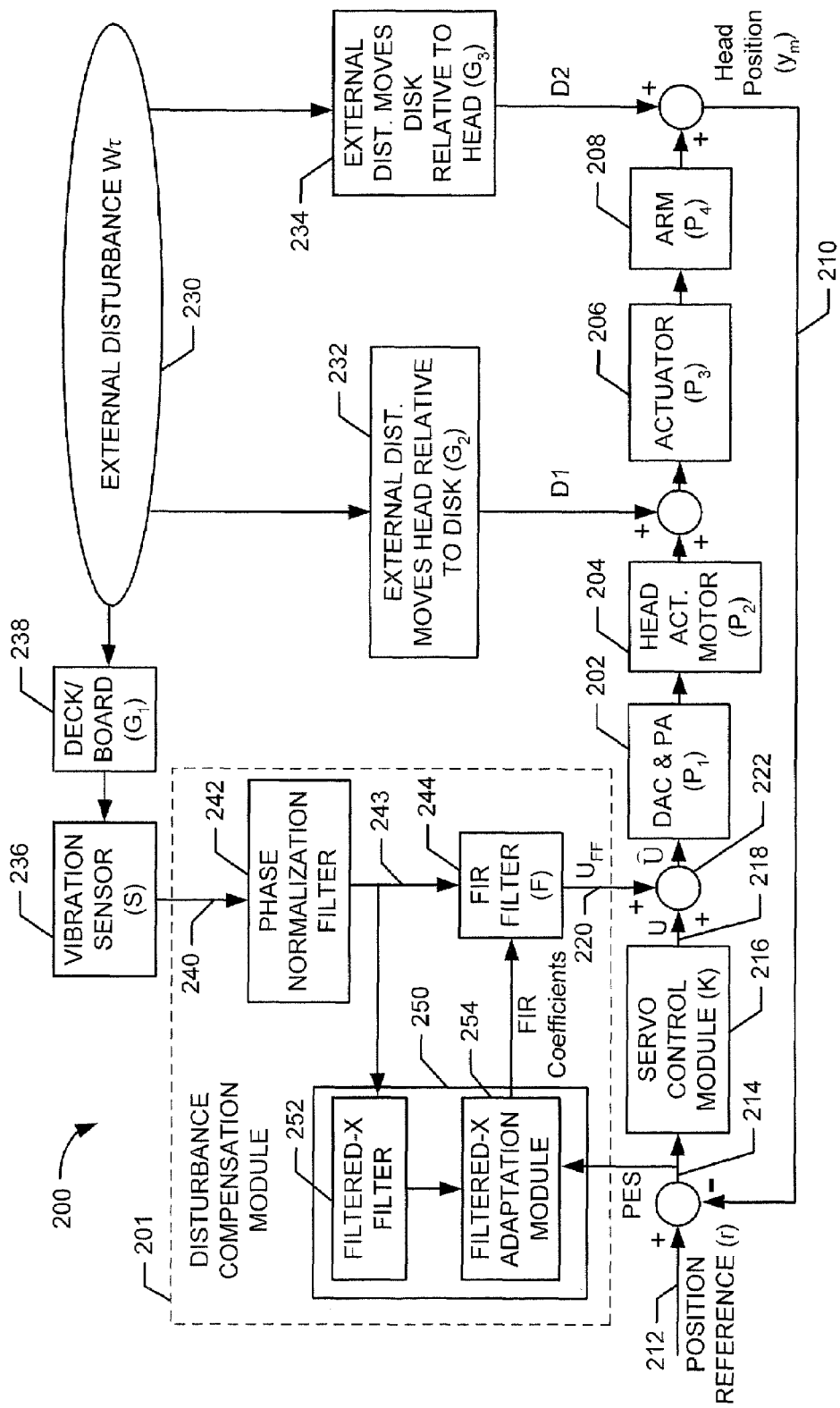
FIG. 2 is a block diagram of a servo control loop configured in a track-following mode and which can be partially embodied within the servo controller of FIG. 1, in accordance with some embodiments.

FIG. 2 is a further block diagram of a servo control loop 200 configured in a track settling and track-following mode and which can be partially embodied within the servo controller 104 of FIG. 1 in accordance with some embodiments.

Referring to FIG. 2, the HDA 108 can be modeled in the servo control loop 200 as including a digital-to-analog converter (DAC) and power amplifier 200 ($P_1$), a head actuator motor (e.g., voice coil motor) 204 ($P_2$), an actuator 206 ($P_3$), and an actuator arm 208 ($P_4$). The position $y_m$ 210 of a read/write head relative to a given track on a disk is sensed (e.g., from servo data on the disk) and compared to a reference position 212 (desired position, r) of the head to generate a position error signal (PES) 214. The PES 214 is therefore indicative of the difference between the actual and desired positions of the head (i.e., head position error), and is provided to a servo control module 216. The servo control module 216 (K) responds to the value of PES 214 to generate a servo control signal 218 (U).

The servo control signal 218 (U) is combined with a feed-forward signal 220 ($U_{FF}$) at summing node 222 to generate a combined control signal (Û). The combined control signal (Û) can be converted by the DAC/power amplifier 202 into an analog signal, assuming it was a digital signal, and then amplified and provided to the head actuator motor 204. The head actuator motor 204 is connected to the actuator 206 which moves the actuator arm 208 in response to the amplified control signal supplied to the head actuator motor 204. The read/write head is connected to the actuator arm 208 (e.g., to an end of the actuator arm 208). In this way, servo control module 216 controls the positioning of the read/write head relative to a selected track on the disc surface during reading/writing of data along the selected track.

An illustrated external disturbance 230 (Wτ) imparts a first disturbance component D1 to the actuator 206 and a second disturbance component D2 to the disk. The first disturbance component D1 moves the head relative to the disk through coupling dynamics 232 (G2) which are typically unknown to the servo controller 104. The second disturbance component D2 moves the disk relative to the head through other coupling dynamics 234 (G3) which are also typically unknown to the servo controller 104.

To enable the servo control loop 200 to sense and compensate for the effects of the external disturbance 230 (Wτ), a vibration sensor 236 is configured to generate an acceleration signal 240 that is indicative of mechanical vibration of the HDA 108. The vibration sensor 236 may include one or more shock sensors, rotational accelerometers, and/or translational accelerometers, and may be attached to a chassis of the disk drive which supports the HDA 108. The external disturbance 230 (Wτ) excites the vibration sensor 236 through the chassis (deck) and/or circuit board, to which it is attached, through coupling dynamics 238 which are typically unknown to the servo controller 104. In an illustrative embodiment, the vibration sensor 236 is mounted on the disk drive chassis and configured so that the acceleration signal 240 indicates the rotational and/or translational vibration affecting the positioning of the head relative to the disk. The acceleration signal 240 is therefore correlated with the external disturbances D1 and D2.

A disturbance compensation module 201 is configured to respond to the vibration signal 240 by generating the feed-forward signal 220 ($U_{FF}$) to counteract the disturbances D1 and D2 to head position caused by the external disturbance 230 (Wτ). The disturbance compensation module 207 can include a phase normalization filter 242, a Finite Impulse Response (FIR) filter 244 (F), and an adaptation module 250.

The acceleration signal 240 is filtered by the phase normalization filter 242 and then by the adaptive Finite Impulse Response (FIR) filter 244 (F) to generate the feed-forward signal 220 ($U_{FF}$). As will be described further below with regard to FIG. 3, the phase normalization filter 242 conditions the acceleration signal 240 to compensate for at least first-order gain and phase lag effects of analog conditioning circuitry and/or analog-to-digital (A/D) conversion circuitry used to generate a digital (time sampled) acceleration signal 240.

The FIR filter 244 can be configured as a tapped delay line having a plurality of coefficient weights that are applied to respective ones of a plurality of time-delayed taps filtering the phase normalized acceleration signal 243. The adaptation module 250 tunes the FIR coefficient weights in response to the phase normalized acceleration signal 243. In some embodiments, the adaptation module 250 uses a modified filtered-X LMS algorithm to tune the coefficient weights of the FIR filter 244 in response to the PES 214 and to the phase normalized acceleration signal 243 to attempt to match the unknown couplings between the external disturbance 230 (Wτ) and the disturbances D1 and D2 affecting the servo control loop, and to thereby cause the feed-forward signal 220 ($U_{FF}$) to cancel the deleterious effects of the external disturbance 230 (WE) on head positioning.

The adaptation module 250 can include a filtered-X filter 252 and a filtered-X adaptation module 254. The filtered-X filter 252 applies a defined transfer function to the phase normalized acceleration signal 243 to generate an output vibration signal FX. The transfer function mathematically approximates a ratio of the PES 214 to the feed-forward signal 220 ($U_{FF}$), and, with reference to FIG. 3, approximates the equation (P1*P2*P3*P4)/[1+(P1*P2*P3*P4)*servo control module gain (K)].

The filtered-X adaptation module 254 tunes the coefficient weights ("FIR Coefficients") used by the FIR filter 244 in response to the output vibration signal FX and the PES 214. In some embodiments the filtered-X adaptation module 254 tunes the coefficient weights based on the following modified filtered-X LMS Equation 1:

$$Wj(k)=V(k)*Wj(k-1)+2\mu(k)\times PES(k)\times FX(k-j), \quad \text{(Equation 1)}$$

where Wj(k) is a j'th one of the coefficient weights used by the FIR filter 244 at discrete time index k. In Equation 1, the term "V(k)" represents a leaky term value, the term "FX" represents the output vibration signal FX from the filtered-X filter 252, and the term "$\mu(k)$" represents an adaptive step size or learning rate at which the coefficient weights are changed to track changes of the PES 214 and the signal FX.

The filtered-X adaptation module 254 regulates the rate of change at which the coefficient weights are changed to track changes of the phase normalized acceleration signal 243 and/or the PES 212 in response to the power level (or another defined characteristic) of the acceleration signal. In some embodiments, the rate of change of the coefficient weights is regulated by controlling the term $\mu(k)$ of Equation 1, which is the adaptive step size or learning rate of the coefficient weights over time. The rate of change, $\mu(k)$, of the coefficient weights can be regulated according to the following Equation 2:

$$\mu(k) = \frac{\psi}{(p(k)+c)}. \quad \text{(Equation 2)}$$

In Equation 2, the term "$\psi$" represents a defined normalized step size parameter, which may be a constant over time. The term "c" is a constant that is defined to prevent singularities (i.e., prevent an excessive rate of change, $\mu(k)$, that may otherwise occur if the denominator approached zero). The term "p(k)" represents an accumulated estimate of power of the acceleration signal 240, and may be determined based on the following Equation 3:

$$p(k)=\lambda*p(k-1)+(1-\lambda)*X^2(k) \quad \text{(Equation 3)}.$$

In Equation 3, the term "λ" represents a factor value that is used to smooth the accumulated acceleration signal power over time. The term "$X^2$" represents the square (i.e., power level) of the vibration signal FX from the filtered-X filter 252.

The rate of change, μ(k), of the coefficient weights can be further constrained to be within a defined range between minimum and maximum values. The minimum and maximum values of the constrained range can be determined from analysis of the range of values that provide sufficiently stable head positioning response for a typical drive that is subjected to expected operational profiles (e.g., frequency and/or amplitude profiles) of the external disturbance 230 (Wτ).

The rate of change, μ(k), of the coefficient weights as defined by Equation 2 is regulated so as to change inversely proportional to the power level of the acceleration signal 240. Accordingly, the rate of change, μ(k), of the coefficient weights increases to more rapidly track changes in the PES 214 and/or the acceleration signal 240 in response to decreased power level of the acceleration signal 240. Conversely, the rate of change, μ(k), of the coefficient weights decreases to more slowly track changes in the PES 214 and/or the acceleration signal 240 in response to increased power level of the acceleration signal 240. Regulating the rate of change, μ(k), of the coefficient weights in this manner may increase the stability with which the disturbance compensation module 201 generates the feed-forward signal 220 ($U_{FF}$) to counteract disturbances to head position over a wider range of expected operational external disturbance 230 (Wτ) profiles.

For example, the stability of the disturbance compensation module 201 may be improved by decreasing the sensitivity of the feed-forward signal 220 ($U_{FF}$) to time variations of the acceleration signal 240 and the PES 214 during periods of higher vibration power, and by increasing the sensitivity of the feed-forward signal 220 ($U_{FF}$) to time variations of the acceleration signal 240 and the PES 214 during periods of lower vibration power.

The stability of the disturbance compensation module 201 may be further improved through the use of the leaky term V(k) in Equation 1 by the filtered-X adaptation module 254. As defined in Equation 1, the filtered-X adaptation module 254 repetitively updates each of the coefficient weights (Wj) by scaling a previous value of a selected one of the coefficient weights (Wj(k−1)) by the leaky term value V(k) in order to provide a defined decay rate over time on the accumulated effect of past values of the selected coefficient weight on the present selected coefficient weight (Wj(k)). The filtered-X adaptation module 254 sums the scaled previous value of the selected coefficient weight [V(k)*Wj(k−1)] to the scaled product of the acceleration signal and the position error signal [2μ(k)×PES(k)×FX(k−j)] to generate a present updated value of the selected coefficient weight (Wj(k)).

The value of the leaky term V(k) is less than one, and can be determined based on the following Equation 4:

$$V(k) = \frac{(p(k) - 2*L*\sigma_n^2)}{p(k)}. \quad \text{(Equation 4)}$$

In Equation 4, the term "p(k)" represents the accumulated estimate of power of the acceleration signal 240, and may be determined based on the above Equation 3. The term "L" represents the length of the FIR filter 244, or number of taps of the FIR filter 244 having weights tuned by the filtered-X adaptation module 254. The term "$\sigma_n^2$" represents a noise variance of the disturbance signal.

The value of the leaky term V(k) can be determined mathematically based on analysis of a typical disk drive, and/or it may be adapted over time during operation of the disk drive in response to the running accumulation of the estimated power (p(k)) of the acceleration signal 240. For example, the leaky term V(k) may be periodically adapted based on the accumulated estimate of power (p(k)) of the acceleration signal 240 according to Equation 3, and/or it may be adapted in response to the accumulated estimate of power (p(k)) exceed one or more threshold power levels.

With further reference to Equation 4, the filtered-X adaptation module 254 may, for example, decrease the leaky term V(k) value in response to an increased level of the power p(k) of the acceleration signal 240, and may increase the leaky term V(k) value in response to an increased level of the power p(k) of the acceleration signal 240. As a result, the stability of the disturbance compensation module 201 may be improved by decreasing the sensitivity of the feed-forward signal 220 ($U_{FF}$) to time variations of the acceleration signal 240 and the PES 214 during periods of higher vibration power, and by increasing the sensitivity of the feed-forward signal 220 ($U_{FF}$) to time variations of the acceleration signal 240 and the PES 214 during periods of lower vibration power.

Figure 3:
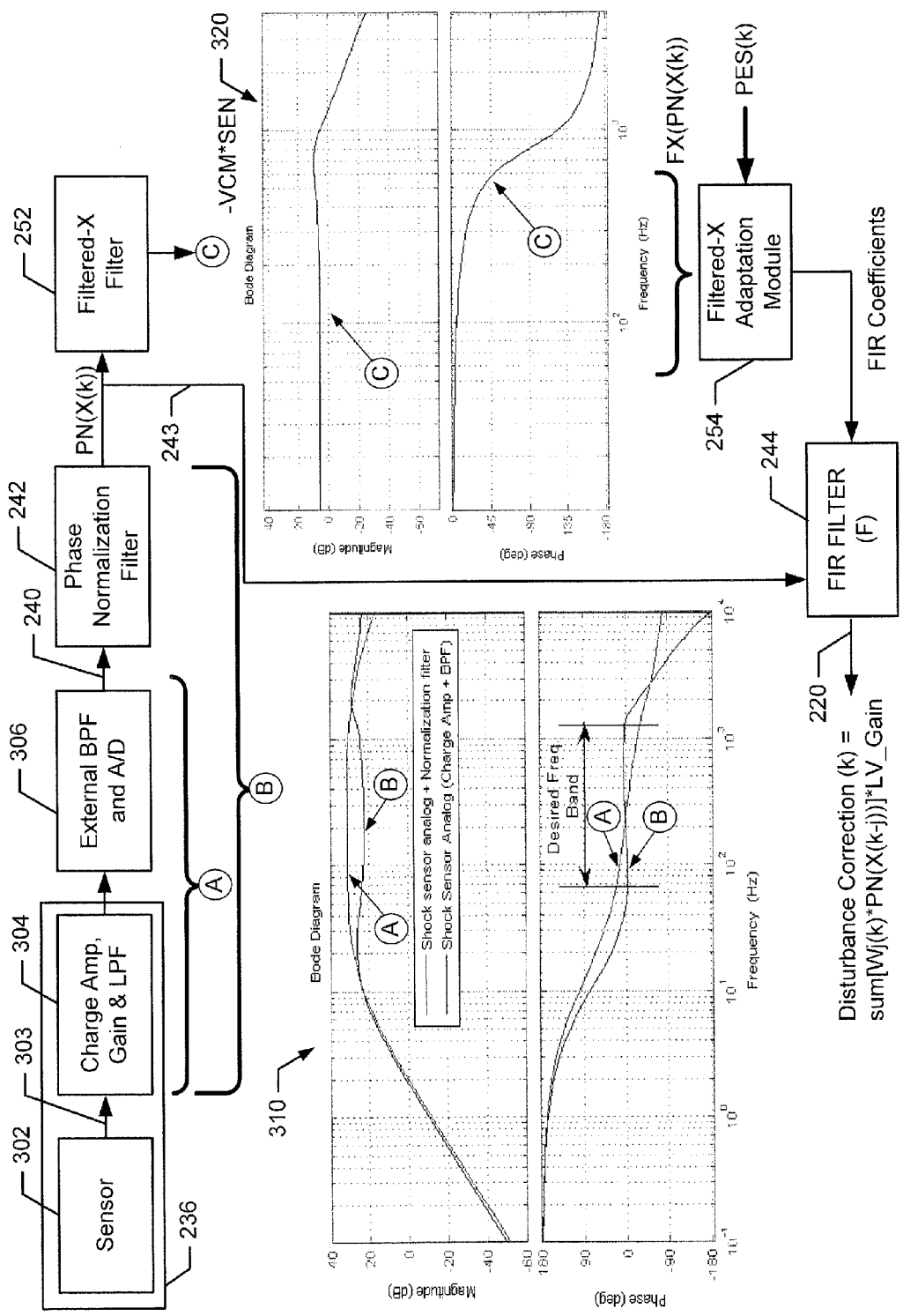
FIG. 3 is a block diagram of a vibration sensor and filtering circuitry of the servo control loop of FIG. 2 and further illustrates Bode diagrams of certain filtering circuitry thereof in accordance with some embodiments.

Further exemplary operations of the phase normalization filter 242 and the filtered-X filter 252 are now described with regard to FIG. 3. FIG. 3 is a block diagram of the vibration sensor 236 and the disturbance compensation module 201 of FIG. 2 and further illustrates Bode diagrams associated with the phase normalization filter 242 and the filtered-X filter 252 in accordance with some embodiments. Referring now to FIG. 3, the vibration sensor 236 may be a piezoelectric device that generates a charge 303 responsive to vibration. A circuit 304 converts the charge into a low pass filtered (LPF) and an amplified voltage. The filtered voltage is band-pass filtered (BPF) by an external band-pass filter (BPF) 306 that may also include an analog-to-digital converter (A/D) that converts the filtered voltage into the conditioned vibration signal 240 that is provided to the phase normalization filter 242.

The charge/LPF circuit 304 and the BPF 306 can introduce undesirable gain and/or phase lag effects into the preliminary vibration signal 303 from the sensor 302, and which can interfere with the ability of the disturbance compensation module 201 to cancel the effects on the disturbances D1 and D2 on head positioning. In accordance with some embodiments, the phase normalization filter 242 filters the vibration signal 240 output by the BPF 306 to counteract at least the first-order gain and/or phase lag effects caused by the charge/LPF circuit 304 and the BPF 306.

The exemplary Bode diagram 310 in FIG. 3 includes a pair of graphed lines (A) that illustrate how the gain and the phase varies between the preliminary vibration signal 303 and the vibration signal 240 in response to variation in frequency of the external disturbance 230 (Wτ). The Bode diagram 310 also includes another pair of graphed lines (B) that illustrate how the phase normalization filter 242 conditions the vibration signal 240 to generate the vibration signal 243 which is compensated for the effects of the charge/LPF circuit 304 and the BPF 306. In particular, the Bode diagram 310 shows that the phase normalization filter 242 compensates the input vibration signal 240 to generate the vibration signal 243 with a substantially constant phase angle and gain relative to the preliminary vibration signal 303 over the illustrated desired frequency band of the external disturbance 230 (Wτ). The desired frequency band can correspond to an expected range of disturbance frequencies that can be encountered during operation of the disk drive and that the disturbance compensation module is primarily configured to attenuate.

As described above, the vibration signal 243 is filtered by the FIR filter 244 to generate the feed-forward signal 220 ($U_{FF}$) based on Equation 1. The vibration signal 243 is also filtered by the filtered-X filter 252 to generate the output vibration signal FX which is used by the filtered-X adaptation module 254 according to Equation 1 to tune the coefficient weights (FIR coefficients) of the FIR filter 244. The vibration signal FX may have the exemplary gain and phase response shown in the other Bode diagram 320 of FIG. 3 over the illustrated frequency range of the external disturbance 230 (Wτ).

Figure 4:
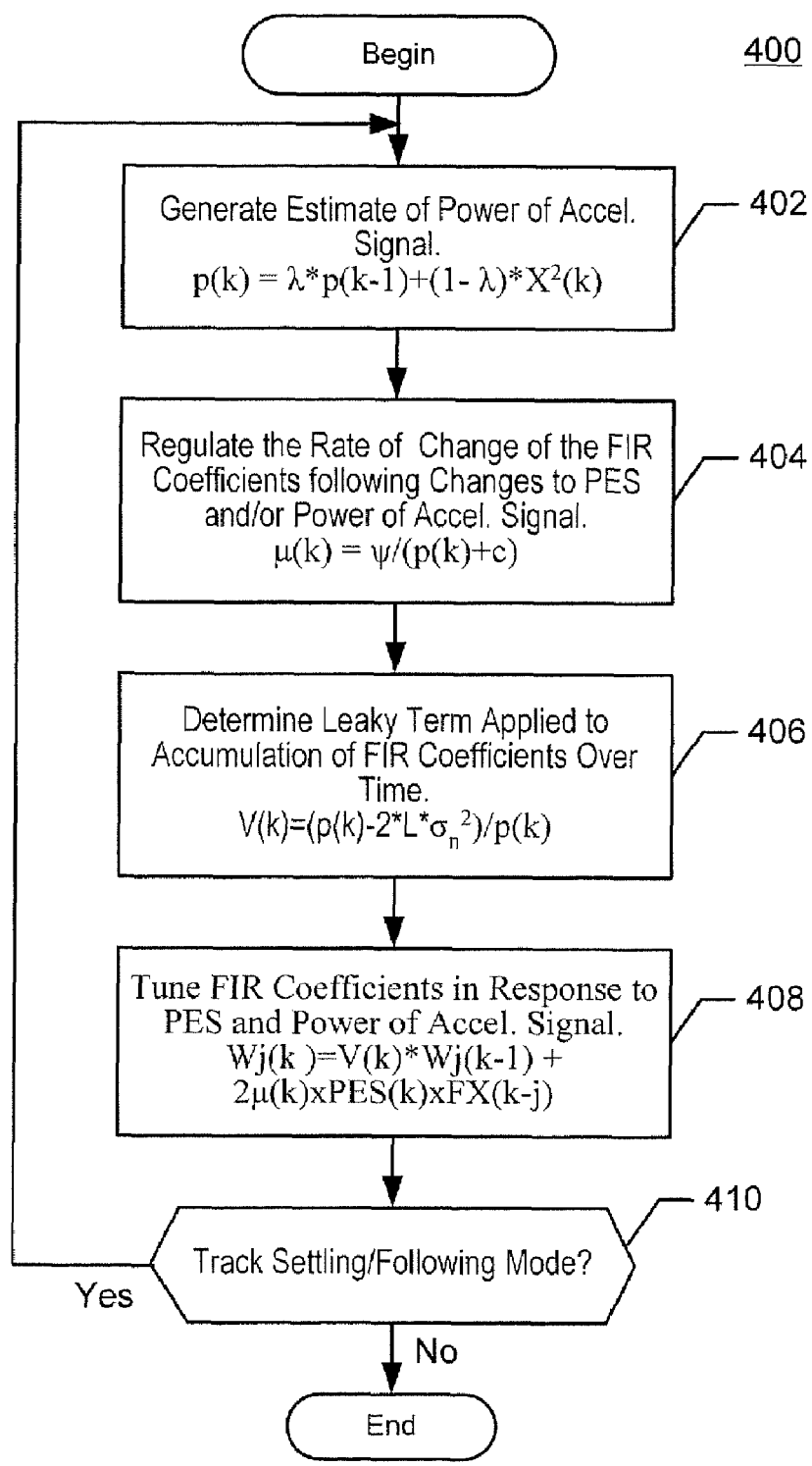
FIG. 4 is a flow chart of operations that are repetitively carried out while the servo control loop is in a track following mode so as to dynamically tune the FIR filter of FIG. 2 to track changes of the acceleration signal and/or the PES and, thereby, attempt to cancel the deleterious effects of the external disturbance on head positioning in accordance with some embodiments.

Referring now to FIG. 4, exemplary operations 400 are illustrated that may be carried out by the filtered-X adaptation module 254 to tune the FIR coefficients weights (coefficient weights) of the FIR filter 244 in accordance with some embodiments. At Block 402, an estimate of the power level of the acceleration signal 243 is generated based on Equation 3, above. The rate at which the FIR coefficients are changed to track changes of the acceleration signal 243 and/or the PES 214 is determined at Block 404 based on Equation 2, above. The leaky term (learning rate) applied to the FIR coefficients over time is determined at Block 406 based on Equation 4, above. The FIR coefficients are tuned in Block 408 in response to the PES 214 and the acceleration signal 243 based on Equation 1, above. The operations of Blocks 402-408 are repetitively carried out while the servo control loop 200 is in a track settling and track following mode to dynamically tune the FIR coefficients to track changes of the acceleration signal 243 and/or the PES 214 and, thereby, cancel the deleterious effects of the external disturbance 230 (Wτ) on head positioning.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A circuit comprising:
a filter coefficient adaptation circuit that responds to an acceleration signal and a position error signal, which is indicative of head position error, by tuning filter coefficients of an adaptive filter to reduce the position error signal, the filter coefficient adaptation circuit responding to a characteristic of the acceleration signal to constrain a rate at which the filter coefficients are changed to track changes of the acceleration signal.

2. The circuit of claim 1, further comprising:
an adaptive filter that responds to the filter coefficients to filter the acceleration signal, which is indicative of mechanical vibration, to generate a feed-forward signal that controls a head actuator to counteract disturbances to head position caused by the vibration.

3. The circuit of claim 2, wherein:
the adaptive filter comprises a finite impulse response (FIR) filter that filters the acceleration signal to generate the feed-forward signal; and
the filter coefficient adaptation circuit tunes filter coefficients applied to each of a plurality of time-delay taps of the FIR filter in response to the acceleration signal and a position error signal, and constrains rate of change of the filter coefficients in response to a characteristic of the acceleration signal.

4. The circuit of claim 3, wherein the filter coefficient adaptation circuit constrains rate of change of the filter coefficients in response to power level of the acceleration signal.

5. The circuit of claim 4, wherein the filter coefficient adaptation circuit increases the rate at which the filter coefficients are changed tracking changes of the acceleration signal and the position error signal in response to decreased power level of the acceleration signal, and decreases the rate of change of the filter coefficients tracking changes of the acceleration signal and the position error signal in response to increased power level of the acceleration signal.

6. The circuit of claim 3, wherein the filter coefficient adaptation circuit uses a least means squares (LMS) algorithm to repetitively tune the FIR filter coefficients in response to a result of multiplication of the acceleration signal and the position error signal.

7. The circuit of claim 6, wherein the filter coefficient adaptation circuit scales the product of the acceleration signal and the position error signal by a learning rate value that is varied inversely proportional to power level of the acceleration signal to generate the FIR filter coefficients.

8. The circuit of claim 7, wherein the filter coefficient adaptation circuit repetitively updates each of the FIR filter coefficients by scaling a previous value of a selected one of the FIR filter coefficients by a leaky term value that provides a defined decay rate over time on effect of past values of the selected FIR filter coefficient on the previous value of the selected FIR filter coefficient, and sums the scaled previous value of the selected FIR filter coefficient to the scaled product of the acceleration signal and the position error signal to generate a present updated value of the selected FIR filter coefficient.

9. The circuit of claim 8, wherein size of the leaky term value is varied over time proportional to the power level of the acceleration signal.

10. The circuit of claim 1, wherein the filter coefficient adaptation circuit constrains rate at which the filter coefficients are changed to track changes of the acceleration signal and the position error signal inversely proportional to a square of the acceleration signal.

11. The circuit of claim 10, wherein the filter coefficient adaptation circuit constrains rate of change of the filter coefficients in response to a ratio of a defined normalized step size value divided to the square of the acceleration signal.

12. The circuit of claim 1, wherein the filter coefficient adaptation circuit constrains the rate at which the filter coefficients are changed to track changes of the acceleration signal and the position error signal to within a defined range of values.

13. The circuit of claim 1, further comprising a phase normalization filter that conditions the vibration signal to counteract gain and phase lag introduced by at least some circuitry between a vibration sensor, which responds to the vibration by generating the vibration signal, and an input of the phase normalization filter, the phase normalization filter outputting a conditioned vibration signal to the filter coefficient adaptation circuit.

14. A method comprising:
tuning filter coefficients of an adaptive filter circuit in response to an acceleration signal, which is indicative of mechanical vibration, and a position error signal, which is indicative of head position error, to reduce the position error signal;

operating the adaptive filter circuit responsive to the filter coefficients to filter the acceleration signal to generate a feed-forward signal that controls a head actuator to counteract disturbances to head position caused by the vibration; and regulating, responsive to a characteristic of the acceleration signal, a rate of change at which the filter coefficients are changed to track changes of the acceleration signal.

15. The method of claim 14, wherein:

operating the adaptive filter circuit comprises operating a finite impulse response (FIR) filter to filter the acceicration signal to generate the feed-forward signal; and tuning the filter coefficients comprises tuning filter coefficients applied to each of a plurality of time-delay taps of the FIR filter in response to the acceleration signal and a position error signal.

16. The method of claim 15, wherein:

tuning the FIR filter coefficients comprises increasing the rate at which the FIR filter coefficients are changed tracking changes of the acceleration signal and the position error signal in response to decreased power level of the acceleration signal, and decreasing the rate of change of the FIR filter coefficients tracking changes of the acceleration signal and the position error signal in response to increased power level of the acceleration signal.

17. The method of claim 15, wherein tuning of the FIR filter coefficients comprises:

using a least means squares (LMS) algorithm to repetitively tune the FIR filter coefficients in response to a result of multiplication of the acceleration signal and the position error signal; and scaling the product of the acceleration signal and the position error signal by a learning rate value that is varied inversely proportional to power level of the acceleration signal to generate the filter coefficients.

18. The method of claim 17, further comprising:

repetitively updating each of the FIR filter coefficients by scaling a previous value of a selected one of the FIR filter coefficients by a leaky term value that provides a defined decay rate over time on effect of past values of the selected FIR filter coefficient on the previous value of the selected FIR filter coefficient, and summing the scaled previous value of the selected FIR filter coefficient to the scaled product of the acceleration signal and the position error signal to generate a present updated value of the selected FIR filter coefficient.

19. A servo control circuit comprising:

a finite impulse response (FIR) filter that filters an acceleration signal, which is indicative of mechanical vibration, using a plurality of coefficients weights that are applied to a plurality of time-delay filter taps of the acceleration signal to generate a feed-forward signal;

a filter coefficient adaptation circuit that responds to the acceleration signal and a position error signal, which is indicative of head position error, by tuning the coefficients weights of the FIR filter to reduce the position error signal, the filter coefficient adaptation circuit responding to a characteristic of the acceleration signal to regulate a rate of change at which the coefficients weights are changed to track changes of the acceleration signal; and a head actuator that responds to the feed-forward signal to control head position to counteract disturbances to head position caused by the vibration.

* * * * *